Dec. 6, 1960 — P. E. GAIRE — 2,963,238
LINE RELEASE FOR A FISHING REEL
Filed April 22, 1955 — 3 Sheets-Sheet 1

INVENTOR
Paul E. Gaire.

Dec. 6, 1960 P. E. GAIRE 2,963,238
LINE RELEASE FOR A FISHING REEL
Filed April 22, 1955 3 Sheets-Sheet 2

INVENTOR
Paul E. Gaire

Dec. 6, 1960 P. E. GAIRE 2,963,238
LINE RELEASE FOR A FISHING REEL
Filed April 22, 1955 3 Sheets-Sheet 3

INVENTOR
Paul E. Gaire

United States Patent Office 2,963,238
Patented Dec. 6, 1960

2,963,238

LINE RELEASE FOR A FISHING REEL

Paul E. Gaire, 101 Mary Ann Lane, Wyckoff, N.J.

Filed Apr. 22, 1955, Ser. No. 503,114

9 Claims. (Cl. 242—84.1)

This invention relates to fishing equipment and more particularly to a line tension release for use in casting with spinners and reels.

The invention is more particularly concerned with improved means for controlling a fishing line during a casting operation wherein the lure is given momentum and the resulting tension in the line must be controlled for an effective casting operation without undue unwinding of the line from the spool of the reel or spinner.

Heretofore, the line has been controlled by a fisherman's thumb for preventing undue slack adjacent the spool, together with sufficient tension in the line to effect a proper casting operation. This means of control, however, has not been found to be effective for casting operations for the reason that the tension in the line must be released when same has attained a certain value for effecting the necessary whip for a perfect casting operation and such critical value cannot be ascertained by a thumb or finger of a fisherman.

It is, accordingly, a primary object of this invention to provide a line tension release whereby the line is set free upon a predetermined tension therein as effected by the momentum of a lure, during a casting operation.

Another object of the invention is to provide a line tension release in the form of an attachment capable of ready association with existing spinners and reels and which is capable of releasing the line under predetermined variable tensions.

A still further object of the invention is to provide improved means for throwing the level winding guide out of operation preparatory to a casting operation.

A still further object of the invention is to provide a line tension release on spinners and reels for use in casting and which has simplicity in design, economy of construction and efficiency in operation.

The novel features that are considered characteristics of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts through the several figures and in which:

Figure 1:
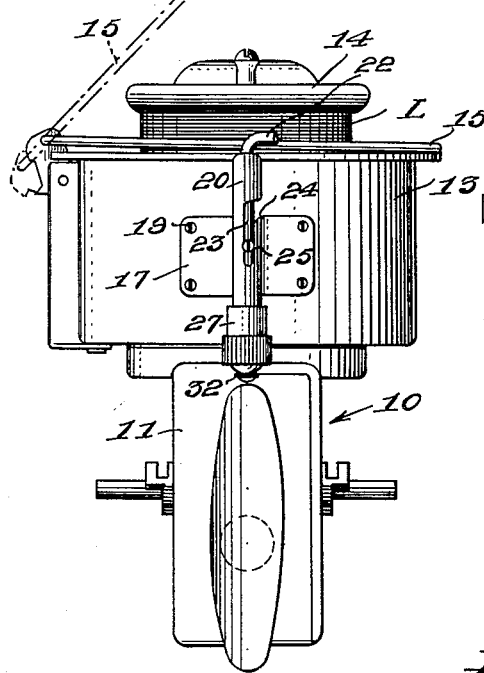
Fig. 1 is a bottom view in elevation of a spinner showing the application of one embodiment of the invention thereto.
Figure 2:
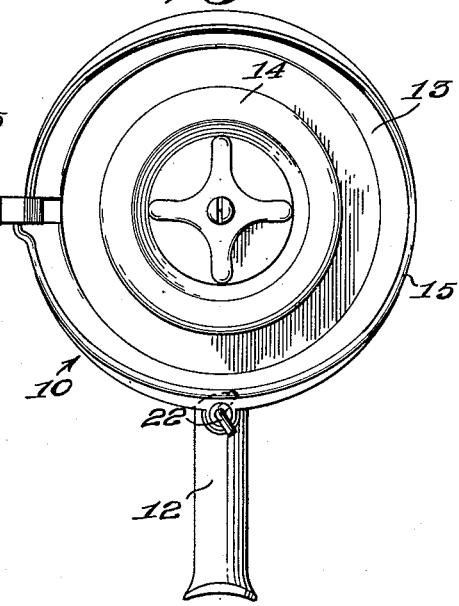
Fig. 2 is a front view in elevation of the spinner with the invention applied thereto.

Referring now in detail to the drawings, specifically to Figs. 1 to 4 thereof, a standard form of spinner 10 generally comprises a gear case 11, an attaching stem 12, a rotatable cup 13 and a spinning reel spool 14. The cup 13 is provided with a pick-up ring 15 shown in operative position in Figs. 1, 2 and 3 in full lines and partially shown in dot-and-dash lines in Fig. 1 in released or inoperative position.

Figure 3:
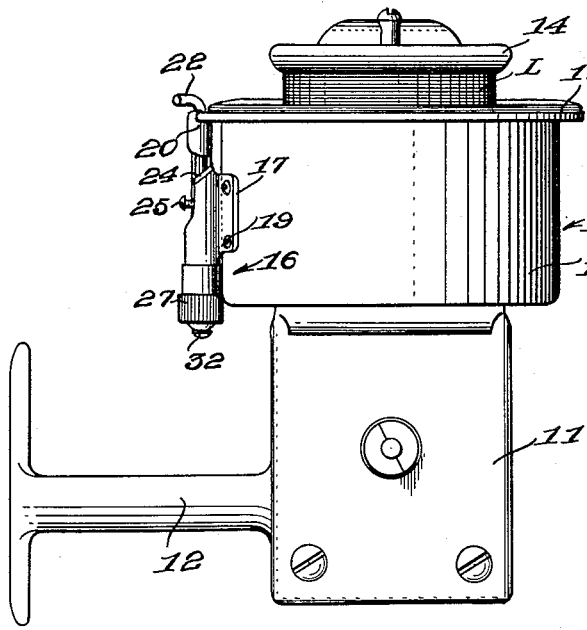
Fig. 3 is a side view in elevation of the spinner with the invention applied thereto.
Figure 4:
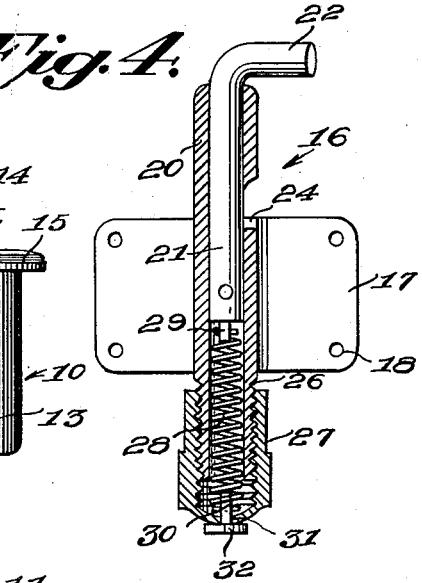
Fig. 4 is an enlarged longitudinal sectional view of the line tension release in accordance with the embodiment of the invention shown in the spinner in Figs. 1–3.
Figure 5:
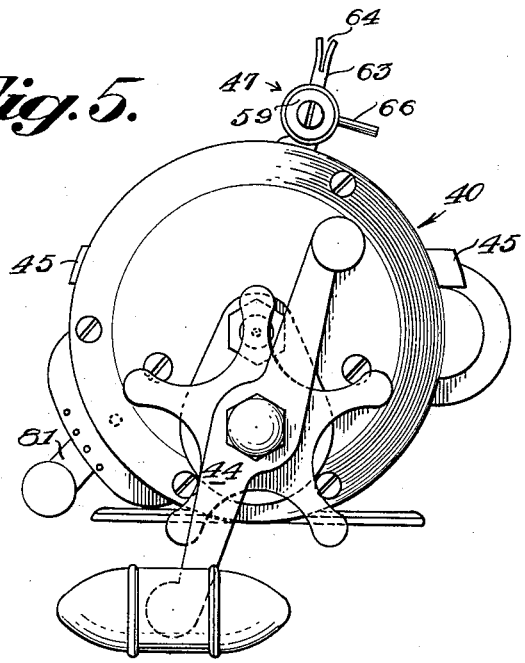
Fig. 5 is an end view in elevation of a fishing reel showing the invention applied thereto in a modified embodiment thereof.
Figure 6:
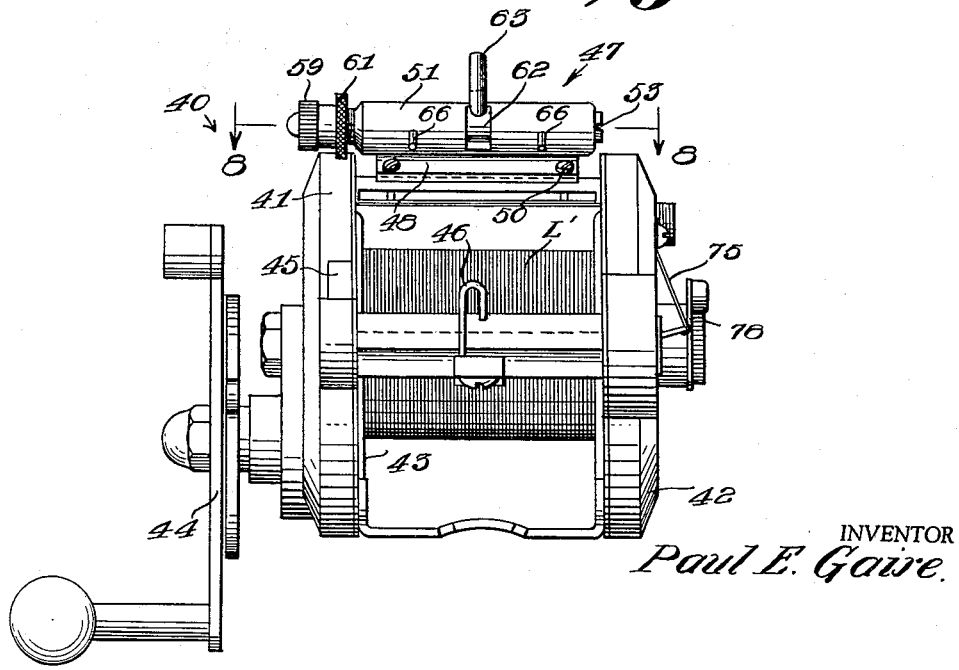
Fig. 6 is a front view in elevation of the reel and attached line tension release.
Figure 7:
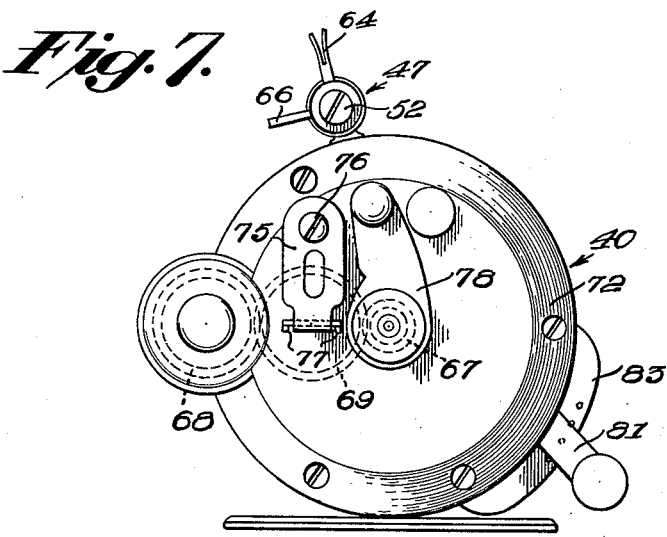
Fig. 7 is a view in elevation of the end opposite to that shown in Fig. 5.
Figure 8:
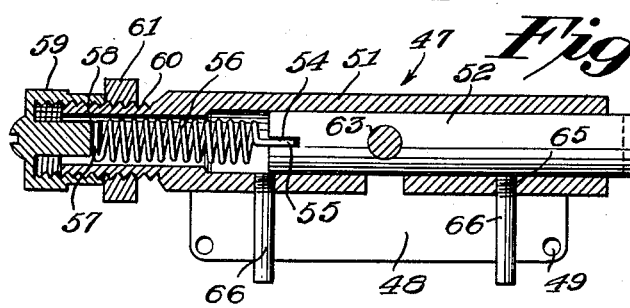
Fig. 8 is an enlarged longitudinal sectional view of the line tension release shown in Figs. 5, 6 and 7, the section being in the plane of line 8—8 of Fig. 6.
Figure 9:
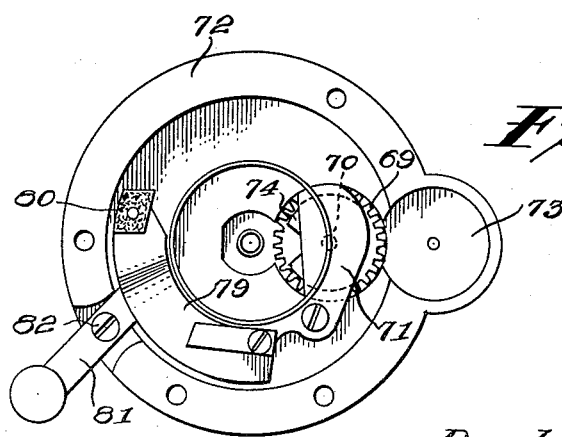
Fig. 9 is a view of the interior of the reel body end cap shown in Fig. 7.

The line L is wound on the spool 14 and the present invention comprises a line release attachment 16 for controlling the line L in casting operations. The attachment 16 comprises a base 17 having corner apertures 18 for the reception of screws 19 by which the base is secured to the cup 13, as shown in Figs. 1 and 3. Rigid with the base 17 is a cylinder 20 which in operative position of the attachment has the axis parallel with the axis of the cup.

A plunger or arm 21 is reciprocally disposed within the cylinder 20 and has an outer angular end portion 22, which is engaged by the line in a casting operation. The cylinder 20 is provided with an elongated slot 23 whose one side edge opens out in a cam surface 24, and a pin or screw 25 is threaded into the plunger 21 and extends through said slot 23 for confining and guiding the plunger 21 in the major extent of its movements. One end of the cylinder 20 is externally threaded at 26 with which is adjustably engaged an internally threaded cap nut 27.

A coil spring 28 is disposed within the cylinder 20 between the confined end of plunger 21 and the cap nut 27. One end of the spring is secured to an apertured extension 29 on the plunger and the opposite end thereof is secured to an apertured extension 30 which is slidable through an aperture 31 in the cap nut and which is provided with a head 32 externally of the cap nut. Thus, the spring 28 is capable of tension variation upon adjustment of the cap nut axially of the cylinder, the greater the tension, the greater will be the resistance to outward axial movement of the plunger 21.

In use, the pick-up ring 15 is disengaged, as indicated by dot-dash lines in Fig. 1, and the line is then hooked over the plunger extension 22. In a casting operation, the momentum of a lure will effect an axial outward pull on the plunger end 22 and when such pull is sufficient to overcome the tension in the spring 28, the screw 25 will ride on the cam surface 24 with a resulting rotation of the plunger about its axis. When the plunger is rotated due to the torsional action of the spring 28, the angular line engaging portion 22 will swing upwardly, to the dotted position shown in Fig. 2, and release the line which will cause a sudden release and whip of the lure. Thus, it will be seen that the angular end portion 22 forms an anchoring means for the line which, before the line is released from such anchoring means, will be effective to prevent the issuance or paying out of the line from the reel in the normal manner.

Referring now to Figs. 5 to 9, a line tension release attachment 47, in accordance with the invention is disclosed in operative association with a conventional form of reel 40. The reel generally comprises opposite circular end members 41 and 42 within which are rotatably supported the opposite ends of the shaft of a spool 43 on which is wound a line L'. The spool is releasably connected, by means of a clutch member 45, with a handle 44 whereby the spool may be driven or be free for spinning during casting operations. The reel also may include the usual line level winding guide 46 which is moved back and forth by means of the usual double groove shaft.

The line tension release attachment 47 includes a base member 48 having apertures 49 for the reception of screws 50 by which the attachment is secured to a cross-strut between the end members 41, 42 adjacent the top of the reel and parallel with the axis thereof. Rigid with the base member 48 is a cylinder 51 in which is rotatably supported a cylindrical bar 52 whose one end 53 extends beyond the corresponding end of the cylinder 51 and is provided with a transverse slot. The opposite end of the bar 52 is provided with a slot 54 in which is received a flat loop 55 on one end of a coil spring 56 whose opposite end is provided with an extension 57 received within a slot 58 in an internally threaded cap nut 59 which, along with a lock nut 61 cooperative therewith, is threaded on an externally threaded extension 60 of the cylinder 51.

The cylinder 51 is provided with a transversely disposed arcuate slot 62 within which is movable a pin or arm 63 having its inner end threaded into the bar 52. The pin 63 is axially slit from its outer end and bent to provide a line receiving slot 64. The torsion spring 56 functions to normally yieldably retain the pin 63 at the upper end of the slot 62 and the resistance to movement of the pin toward the lower end of the slot is varied upon relative rotation of the bar 52 and the cap nut 59 by which the torsion in spring 56 is varied through its connections 55 and 57 with the bar and the cap nut. The cylinder 51 is preferably provided with a pair of threaded apertures 65 on opposite sides of the slot 62 and in which are removably received the threaded inner ends of a pair of line engageable pins 66 which extend forwardly toward the front of the reel.

The shaft for providing movement of the level winding guide 46 is thrown out of operation during a casting operation of the reel and for this purpose the spool shaft is provided with a pinion 67 and the level winding guide shaft is provided with a gear 68 while an idler gear 69 is disposed between the pinion 67 and the gear 68. The idler gear 69 is rotatably supported on a shaft 70 which is supported by a frame 71 on the interior of the removable cap 72 for the circular end member 42 and which cap is provided with a circular recess 73 in which the gear 68 is received. Spring means 74 are disposed between the gear 69 and the frame 71 which normally hold the gears 68 and 69 out of driving mesh as for a casting operation.

On the outer face of the cap 72 is a leaf spring 75, one end of which is secured to the cap as by a screw 76 and the opposite end of which is provided with a pair of pins 77 projecting through corresponding apertures in the cap and with the inner ends of the pins normally out of engagement with the gear 69. For a line winding operation, a cam lever 78 is movable over the spring 75 for forcing the pins 77 inwardly and with a resulting meshing of the gears 68 and 69. The cap 72 is also preferably provided with a brake structure which comprises an arcuate leaf spring 79 secured at one end to the cap and having a spool end engageable brake shoe 80 on its free end. A lever 81 is supported on the cap 72 by a pivot 82 and the inner end thereof has a camming engagement with the spring 79 for moving the shoe 80 into contact with an end disk of the spool under different degrees of braking pressure as may be indicated on the plate 83 over which the lever 81 is movable.

In a casting operation with this embodiment of the invention, the line L' is extended through the guide 46, criss-crossed over the pins 66 and threaded through the slot 64 in the pin 63. The line from the spool to the pin 63 will accordingly be substantially free of tension during a casting operation and the momentum of the lure in such operation will tension the line between the lure and the pin 63. When the line tension reaches a predetermined value, the resistance of spring 56 will be overcome with a resulting movement of the pin 63 to the bottom of the slot 62. When the pin is swung over, the slot 64 is turned toward the line so that the line will readily slip out of the slot 64 and from the pins 66, freeing the line and lure. Thus, it will be seen that the pins 66 together with the pin 63 forms an anchoring means for the line preventing normal operation of the reel. The pin 63 is effective in one position of the release mechanism to positively hold the line against normal issuance from or paying out from the reel, but will permit in another position of the release mechanism, an action such that the line which is looped thereover will slip off the end of the pin 63 to release the line.

The form of line tension release disclosed in Figs. 5 to 9 is equally applicable to the spinner shown in Figs. 1 to 4 in place of the release structure 16 disclosed therein.

Although certain specific embodiments of the invention have been shown and described, it is obvious that many modifications thereof are possible. The invention, therefore, is not to be restricted except insofar as is necessitated by the prior art and by the spirit of the appended claims.

I claim:

1. For use with a fishing reel having a spool upon which a fishing line is wound, a device for holding the line from issuing from the spool during a casting operation until such time as a predetermined tension is produced in the line and which is then operative to suddenly and completely disengage the line so that it may issue unhindered from the spool, said device including a base secured to the reel, anchoring means mounted on said base, said anchoring means including a rigid anchoring pin movable with respect to said base between first and second positions, resilient means on said base engaging said anchoring means to normally urge said anchoring pin to said first position thereof, said anchoring pin having a free and unobstructed end portion over which a loop of the line is adapted to be engaged, said anchoring pin, when disposed in its first position, having its free and unobstructed end portion angulated away from the path of movement of said line in issuing unhindered from the reel at an angle of about 90° with respect to the path of the line, said line being engaged with said anchoring means over said free and unobstructed end of the anchoring pin when said anchoring pin is in the first position positively preventing issuance of the line from said spool at any time the line is thus engaged with the device, said anchoring pin being movable in opposition to said resilient means in response to a predetermined tensioning of said line as occasioned by inertia force set up during the casting operation, the second position of said anchoring pin being displaced from the first position thereof by about 90° in order that the line can slip off the free and unobstructed end portion of the pin, when the pin is in the second position, and be suddenly and completely disengaged from the device so that the line issues directly from the spool unhindered by the device.

2. In the assembly as defined in claim 1 wherein said base includes a cylinder, said anchoring means being in the form of a bar rotatively received in said cylinder, said anchoring pin being rigid with and projecting radially from said bar.

3. In the assembly as defined in claim 1 wherein said base includes a cylinder, said anchoring means being in the form of a plunger reciprocably and rotatively disposed in the cylinder and projecting outwardly thereof, a portion of said plunger external to said cylinder being disposed in laterally projecting relation to the remainder of the plunger and constituting said anchoring pin.

4. A line tension release means for use on a fishing reel including a frame having a line supporting spool rotatably supported therein; comprising an elongated cylinder removably supported on said frame in parallel relation to the axis of said spool, an elongated cylindrical rod disposed within said cylinder with capacity for rotational movement therein, a slot in said cylinder transverse to the axis thereof, a pin supported by said rod and extending through said slot and having a notch in its free end for receiving said line, and spring means within said cylinder normally imparting rotation to said rod with the said pin engaged with one end of said slot, said spring being yieldable under predetermined tension in said line as effected by the momentum of a lure in a casting operation whereby said pin moves away from said one end of the slot with resulting discharge of the line from said notch.

5. The structure according to claim 4, together with means supported by said cylinder operative to vary the effort of said spring means on said rod for discharge of the line from said notch under predetermined variable tensions in said line.

6. The structure according to claim 5 wherein said means supported by the cylinder comprises a cap nut threadedly engaged with one end of said cylinder, and said spring means comprising an elongated torsion coil spring having opposite ends thereof engaged with said rod and said cap nut.

7. The structure according to claim 4, together with a line engageable pin projecting laterally of said cylinder at each side of said first pin.

8. A line tension release device for use with casting rods carrying reels and spinning reels and including a frame and a spool on which a fishing line is wound and from which the line with a lure connected thereto is cast in the fishing operation, said device comprising a rigid arm movably supported on the frame and having an open notch in its free end portion within which the line is freely and loosely engaged as it leaves the spool, said arm being movable about an axis substantially perpendicular to the direction of the line during casting, a coiled spring cooperating with said arm for holding same in normal line engaging position and permitting same to move from said normal position to a line releasing position under a predetermined tension in the line by the lure during a casting operation to disengage the line from the notch and arm, and means engaging said frame and the coiled spring for varying the tension of the spring.

9. A line tension release device for use with casting rods carrying reels and spinning reels and including a frame and a spool on which a fishing line is wound and from which the line with a lure connected thereto is cast in the fishing operation, said device comprising a rigid arm movably supported on said frame and over which the line is loosely engaged as it leaves the spool, said arm being movable about an axis substantially perpendicular to the direction of the line during casting, a coiled spring cooperating with said arm for holding same in normal line engaging position and permitting same to move from said normal position to a line releasing position under a predetermined tension in the line induced by the lure during a casting operation, means engaging said arm and said coiled spring for varying the tension of the spring, and a spaced pair of pins fixed in relation to the frame between said arm and the spool and extending in the direction of the line during casting for guiding the line between the spool and said arm.

References Cited in the file of this patent

UNITED STATES PATENTS

| 2,262,462 | Margis | Nov. 11, 1941 |
| 2,637,508 | Battaglia | May 5, 1953 |
| 2,753,129 | Martin | July 3, 1956 |

FOREIGN PATENTS

| 990,962 | France | June 13, 1951 |